United States Patent
Ou-Yang et al.

(10) Patent No.: US 11,348,586 B2
(45) Date of Patent: May 31, 2022

(54) SYSTEMS AND METHODS FOR EXTENDING AND ENHANCING VOICE ASSISTANT AND/OR TELECOMMUNICATION SOFTWARE FUNCTIONS TO A REMOTE ENDPOINT DEVICE

(71) Applicant: DELL PRODUCTS L.P., Round Rock, TX (US)

(72) Inventors: Kang Ou-Yang, New Taipei (TW); Michael Wu, Taipei (TW); Chung-Hung Liu, Taipei (TW); Chen Yang Chen, Taipei (TW); Hsuan-Yin Tsai, Taipei (TW)

(73) Assignee: Dell Products L.P., Round Rock, TX (US)

(*) Notice: Subject to any disclaimer, the term of this patent is extended or adjusted under 35 U.S.C. 154(b) by 177 days.

(21) Appl. No.: 16/014,468

(22) Filed: Jun. 21, 2018

(65) Prior Publication Data
US 2019/0392838 A1 Dec. 26, 2019

(51) Int. Cl.
G10L 15/30 (2013.01)
G06F 21/32 (2013.01)
H04L 51/56 (2022.01)
G10L 15/22 (2006.01)
G10L 15/26 (2006.01)

(52) U.S. Cl.
CPC .............. *G10L 15/30* (2013.01); *G06F 21/32* (2013.01); *G10L 15/22* (2013.01); *G10L 15/26* (2013.01); *H04L 51/36* (2013.01); *G10L 2015/226* (2013.01)

(58) Field of Classification Search
CPC ... G10L 15/26; G10L 2015/226; G10L 15/30; G10L 15/22; H04L 51/36; G06F 21/32
USPC ........................................................ 704/275
See application file for complete search history.

(56) References Cited

U.S. PATENT DOCUMENTS

| | | | | |
|---|---|---|---|---|
| 7,334,050 | B2* | 2/2008 | Zondervan | H04L 67/02 709/224 |
| 8,989,713 | B2* | 3/2015 | Doulton | G06Q 10/107 704/235 |
| 8,996,386 | B2* | 3/2015 | Alasry | G10L 15/06 704/270 |
| 2002/0193989 | A1* | 12/2002 | Geilhufe | G10L 15/26 704/E15.045 |
| 2003/0187655 | A1* | 10/2003 | Dunsmuir | H04M 3/53333 704/E15.045 |
| 2005/0147117 | A1* | 7/2005 | Pettey | H04L 49/356 370/463 |
| 2010/0083352 | A1* | 4/2010 | Arnison | G10L 21/06 704/270.1 |
| 2013/0169736 | A1* | 7/2013 | Lindblom | H04M 1/2535 348/14.02 |

(Continued)

OTHER PUBLICATIONS

Fitzsimmons, "7 Big Things You Need to Know about the Brand-New Skype", Tech Radar, Jun. 2017, 13 pgs.

(Continued)

*Primary Examiner* — Michael Colucci
(74) *Attorney, Agent, or Firm* — Egan, Enders & Huston LLP.

(57) ABSTRACT

Systems and methods are provided that that may be implemented to extend functionality of a voice assistant and/or telecommunications software to a remote location via an endpoint device.

7 Claims, 7 Drawing Sheets

(56) References Cited

U.S. PATENT DOCUMENTS

| | | | | |
|---|---|---|---|---|
| 2013/0212602 A1* | 8/2013 | Yamazaki | ............ | G06F 3/1254 719/321 |
| 2013/0318345 A1* | 11/2013 | Hengeveld | .......... | H04L 12/4633 713/168 |
| 2014/0278435 A1* | 9/2014 | Ganong, III | ............ | G10L 15/22 704/275 |
| 2015/0154976 A1* | 6/2015 | Mutagi | .................. | G06F 3/167 704/275 |
| 2016/0092153 A1* | 3/2016 | DeMik | .................... | H04L 12/18 434/309 |
| 2016/0104480 A1* | 4/2016 | Sharifi | .................... | G10L 15/08 704/254 |
| 2016/0349953 A1* | 12/2016 | Adler | ...................... | G08B 21/24 |
| 2017/0195636 A1* | 7/2017 | Child | .................. | H04L 12/2803 |
| 2017/0295117 A1* | 10/2017 | Pfriem | .................. | H04L 51/046 |
| 2019/0378504 A1* | 12/2019 | Bender | .............. | G06K 19/0723 |

OTHER PUBLICATIONS

Pullen, "The Ultimate Guide to the Amazon Echo", Time, Feb. 2016, 9 pgs.
Wollerton, "Apple HomePod Review", May 2018, 9 pgs.
Smart Home, "Apple HomePod Tips and Tricks to Get You Started", Printed from Internet May 29, 2018, 9 pgs.
Ingraham, "Apple's HomePod in Stereo: When Two Become One", Jun. 5, 2018, 9 pgs.
Nichols, "Cortana, Windows 10's Built-In Virtual Assistant, is Both Really Cool and Really Creepy", Computer World, Aug. 2016, 4 pgs.
Gebhart, "Google Home Review: A Great Smart Speaker That's Its Own Worst Enemy", Part 2, CNET, May 2018, 8 pgs.
Gebhart, "Google Home Review: A Great Smart Speaker That's Its Own Worst Enemy", Part 1, CNET, May 2018,7 pgs.
Palladino, "Harman Kardon Invoke Review: Cortana Isn't Too Comfortable in the Home Yet", Oct. 2017, 9 pgs.
Claburn, "Micrsoft Boasted It Had Rebuilt Skype From the Ground Up, Instead It Should Have Buried It", Jul. 2017, 5 pgs.
Tarantola, "One Week With Microsoft Cortana", Aug. 2017, 6 pgs.
Crist, "The New Amazon Echo Improves Upon the Original, Slashes the Price", CNET, May 2018, 6 pgs.
"What Is Alexa" What Is The Amazon Echo, and Should You Get O, Wirecutter, Printed From Internet Jun. 7, 2018, 26 pgs.

* cited by examiner

SYSTEMS AND METHODS FOR EXTENDING AND ENHANCING VOICE ASSISTANT AND/OR TELECOMMUNICATION SOFTWARE FUNCTIONS TO A REMOTE ENDPOINT DEVICE

FIELD

This invention relates generally to information handling systems and, more particularly, to extension of information handling systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

Disclosed herein are systems and methods that may be implemented to extend functionality of a voice assistant and/or telecommunications software to a remote location via an endpoint device.

In one respect, disclosed herein is an information handling system, including at least one programmable integrated circuit, the programmable integrated circuit being configured to be coupled in communication with an endpoint device at a remote location via a digital communications network, the programmable integrated circuit being programmed to: execute voice assistant and/or telecommunications software; and control input and output sources of the voice assistant and/or the telecommunications software to enable the endpoint device to send audio streams to the voice assistant and/or the telecommunications software and to enable the endpoint device to receive audio streams from the voice assistant and/or the telecommunications software to extend functionality of the voice assistant and/or telecommunications software executing on the programmable integrated circuit to the remote location via the endpoint device.

In one exemplary embodiment, an audio I/O controller, may be executable by the programmable integrated circuit to control input and output sources of the voice assistant and/or the telecommunications software to enable the endpoint device to send audio streams to the voice assistant and/or the telecommunications software and to enable the endpoint device to receive audio streams from the voice assistant and/or the telecommunications software. A communications protocol endpoint may be executable by the programmable integrated circuit and in communication with the audio I/O controller, to enable one or more real-time audio/data/media channels to be established between the information handling system and the endpoint device so that audio/data/media streams may be transmitted and received between the endpoint device and the voice assistant and/or the telecommunications software. A voice recognition controller, may be executable by the programmable integrated circuit, to receive a digital data representation of a voice input from the endpoint device via the communication protocol endpoint and translate the voice input to text and sends the translated text as an input command to the voice assistant and/or telecommunications software. The voice recognition controller may additionally receive text from the voice assistant and/or the telecommunications software and translate the text into a digital data representation of a voice output for provision to the communication protocol endpoint. An email controller, may be executable by the programmable integrated circuit, to: communicate with an email program to fetch email messages and to reply to and/or create email messages; and to forward fetched email messages to the voice assistant for the voice assistant to read out to a user of the endpoint device over the network. The voice recognition controller may additionally send translated text as an input command to the email controller to read and/or reply to an email message; and the voice recognition controller may additionally translate text of an email message received from the email controller into a digital data representation of a voice output for provision to the communication protocol endpoint.

In one exemplary embodiment, an audio I/O controller may be configured to: set a default input device of the communications protocol endpoint running on the host computer to be a virtual input endpoint of the audio I/O controller; and set a default output device of the communications protocol endpoint running on the host computer to be a virtual output endpoint of the audio I/O controller. The audio I/O controller may be further configured to: set a default input device of the telecommunications software to be a virtual input endpoint of the audio I/O controller; and set a default output device of the telecommunications software to be a virtual output endpoint of the audio I/O controller. The audio I/O controller may be configured to: set a default input device of the telecommunications software to be a virtual input endpoint of the voice assistant; and set a default output device of the telecommunications software to be a virtual output endpoint of the voice assistant.

In another resect, disclosed herein is a method, including extending functionality of telecommunications software running on a host computer to a remote location via an endpoint device that includes a microphone and a speaker, by: sending, by a communications protocol running on the endpoint device, an audio stream to the host computer over a digital communications network, wherein the audio stream is a digital data version of a voice input spoken by a user into the endpoint device microphone; receiving the audio stream from a communications protocol endpoint running on the host computer; and providing the audio stream to the telecommunications software.

In one exemplary embodiment, the host computer and the endpoint device may be in communication via the digital communications network, and the method may comprise: sending, by a communications protocol endpoint running on the endpoint device, an audio stream to the host computer over the network, wherein the audio stream is a digital data version of a voice input spoken by a user into the endpoint device microphone; receiving, by an audio I/O controller running on the host computer, the audio stream from a communications protocol endpoint running on the host computer; and providing, by the audio I/O controller, the audio stream to the telecommunications software. In one embodiment the method may further include: providing, by the audio I/O controller, a second audio stream received from the telecommunications software to the communications protocol endpoint running on the host computer; receiving, by the communications protocol endpoint running on the endpoint device, the second audio stream over the network; and providing, by the communications protocol endpoint running on the endpoint device, the second audio stream to the endpoint device speaker for playing for the user. In one embodiment, the method may further include prior to sending the audio stream to the host computer, establishing a real-time audio communication channel between the communications protocol endpoints running on the host computer and the endpoint device for sending and receiving the first and second audio streams over the network. In one embodiment, the method may further include prior to said sending the audio stream to the host computer, by the audio I/O controller: setting a default input device of the communications protocol endpoint running on the host computer to be a virtual input endpoint of the audio I/O controller; setting a default output device of the communications protocol endpoint running on the host computer to be a virtual output endpoint of the audio I/O controller; setting a default input device of the telecommunications software to be a virtual input endpoint of the audio I/O controller; and setting a default output device of the telecommunications software to be a virtual output endpoint of the audio I/O controller. In one embodiment, the method may further comprise: prior to said sending the audio stream to the host computer, activating the endpoint device from among a plurality of endpoint devices capable of extending the functionality of the telecommunications software. In one embodiment, the activating of the endpoint device may be performed by a cellular telephone.

In another respect, disclosed herein is a method, including extending functionality of a voice assistant and/or email program running on a host computer to a remote location via an endpoint device that includes a microphone by: sending, by a communications protocol running on the endpoint device, an audio stream to the host computer over a digital communications network, wherein the audio stream is a digital data version of a voice command spoken by a user into the endpoint device microphone; receiving the audio stream from a communications protocol running on the host computer; using voice recognition to convert the audio stream to a text command; and providing the text command to the voice assistant and/or email program to read and/or reply to an email message stored by the email program.

In one exemplary embodiment, the host computer and the endpoint device may be in communication via the digital communications network, the endpoint device may include a microphone, and the method may include: sending, by a communications protocol endpoint running on the endpoint device, an audio stream to the host computer over the network, wherein the audio stream is a digital data version of a voice command spoken by a user into the endpoint device microphone; receiving, by a voice recognition controller running on the host computer, the audio stream from a communications protocol endpoint running on the host computer; converting, by the voice recognition controller, the audio stream to a text command; and providing, by the voice recognition controller, the text command to the voice assistant and/or an email controller running on the host computer that is in communication with the email program to read and/or reply to an email message stored by the email program.

In one embodiment, the method may further include: receiving from the voice assistant and/or email controller, by the voice recognition controller, a text response to the text command; converting, by the voice recognition controller, the text response to a second audio stream; and sending, by the communications protocol endpoint running on the host computer, the second audio stream to the endpoint device over the network; and providing, by the communications protocol endpoint running on the endpoint device, the second audio stream to the endpoint device speaker for playing for the user. In one embodiment, the text response may include the email message provided by the email program to the email controller. In one embodiment, the text command may include text in reply to the email message. In one embodiment, the method may further include causing, by the voice assistant in response to the text command, a second audio stream of music to be provided to the communications protocol endpoint running on the host computer for provision to the endpoint device over the network. In one embodiment, the endpoint device may include a camera, and the method may further include recognizing, by the endpoint device, a face of the user or a gesture by the user and viewed by the camera; sending, by the communications protocol endpoint running on the endpoint device, a second audio stream to the host computer over the network, wherein the second audio stream is a digital data version of a command generated in response to said recognizing; and performing, by the host computer, an action in response to receiving the second audio stream, wherein the action is one of the following list of actions: login to the host computer based on the recognized face of the user; and an action based on the recognized gesture made by the user from one of the following list of actions: activate/deactivate an endpoint device; control a volume; control mute/unmute a call; and hang up a call.

DESCRIPTION OF ILLUSTRATIVE EMBODIMENTS

Figure 1:
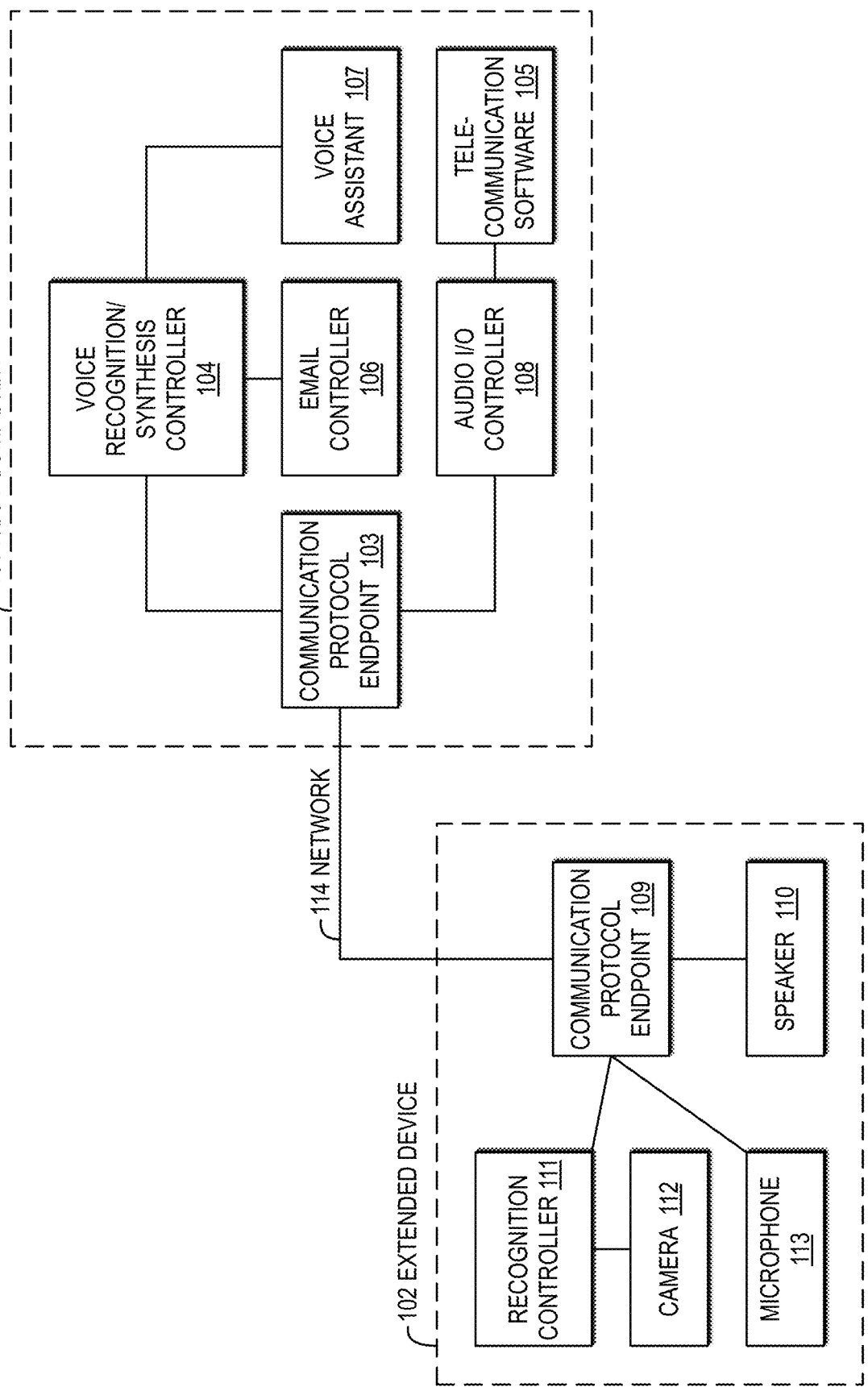
FIG. 1 is a block diagram of a system as it may be configured according to one exemplary embodiment of the disclosed systems and methods.

A glossary of terms for the disclosed embodiments is provided here.

A communication protocol endpoint is a program executing on a host computer and on an endpoint device that enables one or more real-time audio/data/media channels to be established between the host computer and endpoint device so that audio/data/media streams may be transmitted and received between the host computer and the endpoint device. Examples of a communication protocol endpoint are WebRTC (Web Real Time Communication) or ORTC (Object Real Time Communication) that allow media (audio or video) to be streamed between two applications (e.g., web browsers or other applications) and voice over IP (VoIP) protocol programs, although other communication protocol endpoints may also be employed.

A host computer is an information handling system capable of executing an operating system, communication protocol endpoint, voice assistant, telecommunications software, voice recognition/synthesis controller, email controller, audio I/O controller, and other software. The information handling system includes a programmable integrated circuit (e.g., processor) and memory for storing the programs that execute on the programmable integrated circuit. A host computer may also be referred to herein as a target computer. Examples of a host computer are personal computers, desktop computers, laptop computers, notebook computers (e.g., manufactured and/or sold by Dell Technologies Inc. of Round Rock, Tex.), although other types of computers may also be employed.

An endpoint device is a device having a speaker and microphone and programmable integrated circuit capable of executing one or more client applications, including a communication protocol endpoint to facilitate communication between the endpoint device and a host computer. The device (i.e., information handling system) includes a programmable integrated circuit (e.g., processor) and memory for storing the programs that execute on the programmable integrated circuit. When the endpoint device is activated, audio input received on the microphone of the endpoint device is forwarded to a host computer via the communication protocol endpoint, and audio received from a host computer via the communication protocol endpoint is played on the speaker of the endpoint device. Conversely, when the endpoint device is deactivated, audio input received on the microphone of the endpoint device is no longer forwarded to the host computer via the communication protocol endpoint, and audio received from the host computer via the communication protocol endpoint is no longer played on the speaker of the endpoint device. An endpoint device may also include a camera and be capable of executing a facial/gesture recognition controller. When the endpoint device is activated, the facial/gesture recognition controller may send a command to a host computer, e.g., via a communication protocol endpoint, in response to recognition of a face/gesture. Conversely, when the endpoint device is deactivated, the facial/gesture recognition controller no longer sends a command to a host computer in response to recognition of a face/gesture. An endpoint device may also be referred to herein as an extended device or spot. Examples of an endpoint device are a Raspberry Pi, personal computer, and cell phone, although other types of devices may also be employed.

A voice assistant is a program executing on a host computer that is capable of receiving voice commands and performing the commands on the host computer. Examples of the types of voice commands a voice assistant is capable of performing include setting a timer/alarm, playing a song, reading the news, getting the current time, checking the weather, controlling lights/thermostat, adding an item to a shopping list, making a purchase, although other voice commands may be performed by a voice assistant. Examples of a voice assistant are Microsoft Cortana, Apple Siri, Google Home, and Amazon Alexa, although other voice assistants may also be employed.

Telecommunications software is a program executing on a host computer that enables a user to converse remotely with other people, e.g., to perform an online audio or audio and video conference call. Examples of telecommunications software are Skype, Skype for Business, Google Hangouts, VSee, UberConference, GoToMeeting, Webex, Voca, Viber, oovo, Voxox, and jitsi, although other types of telecommunications software may also be employed.

A voice recognition and synthesis controller (VRSC) is a program (e.g., written in C# or other suitable programming language) executing on a host computer that receives a digital data representation of a voice input (e.g., from a communication protocol endpoint) and translates it to text and sends the translated text as an input command to another program, such as a voice assistant, an email controller, or telecommunications software. A VRSC also receives text from another program (e.g., a voice assistant, an email controller, or telecommunications software) and translates it into a digital data representation of a voice output for provision to another program (e.g., a communication protocol endpoint). In one embodiment, a VRSC is a Universal Windows Platform (UWP) application that uses text-to-speech and speech-to-text technologies for human interface and voice commands management provided by an operating system and/or application provided by the operating system such as Microsoft Windows 10 and/or Cortana.

An audio I/O controller is a program (e.g., written in Python or other suitable programming language) executing on a host computer that controls the input and output sources of applications (e.g., telecommunications software, voice assistant, email) executing on the host computer to enable an endpoint device to send audio streams (e.g., voice command or conference call audio stream sent via communication protocol endpoints) to the host applications and to enable the endpoint device to receive audio streams from the host computer applications (e.g., command response, email, music, or conference call audio stream received via communication protocol endpoints). The audio I/O controller may employ inter-process communication (e.g., provided by the operating system, e.g., Windows, Linux) and may convert text sent by an endpoint device into a mouse/keyboard command to perform telecommunication-related operations, e.g., join a call, mute, hang up.

An email controller is a program (e.g., written in Python or other suitable programming language) executing on a host computer that communicates with an email program (e.g., Microsoft Outlook) to fetch email messages (e.g., from a folder through Outlook MAPI Reference) and to reply to and/or create email messages. The email controller forwards a fetched email message to a voice assistant for the voice assistant to read out to a user of an endpoint device over a network, e.g., via a voice synthesis controller and communication protocol endpoints. Conversely, the email controller receives text from an endpoint device, e.g., via a voice recognition controller and communication protocol endpoints, and communicates the text to the email program to reply to and/or create an email message. Although Outlook has been described as an email program with which an email controller communicates, in other embodiments the email controller communicates with other email programs (e.g., Mozilla Thunderbird, Apple Mail, and Eudora).

A facial/gesture recognition controller (FGRC) is a program (e.g., written in Python or other suitable programming language) executing on an endpoint device that receives a digital data representation of image input (e.g., from a camera) and recognizes from it gestures and/or user characteristics (e.g., face, retina, fingerprint) and in response sends a command to a host computer, e.g., via a communication protocol endpoint. The command sent to the host computer may be used to activate/deactivate the endpoint device, control volume, control mute/unmute, hang up a call, etc. In one embodiment, a recognition controller employs the OpenCV Library.

An endpoint device control program is a program (e.g., written in JavaScript or other suitable programming language) executing on an endpoint device that displays for a user one or more endpoint devices, enables the user to select one of the endpoint devices, and activates/deactivates the selected endpoint device as instructed by the user. Preferably, the endpoint control device includes a console graphical user interface (GUI).

FIG. 1 is a block diagram of a system 100 as it may be configured according to one embodiment of the disclosed systems and methods. The system 100 may be characterized as having a client-server architecture that extends usage of a voice assistant, telecommunications software and/or email program running on a host computer to multiple locations having endpoint devices usable by a user. The system 100 includes a host computer 101 and an endpoint device 102 in communication via a network connection 114. The network 114 may be a local area network (e.g., within a home or business, e.g., including wired and wireless (e.g., Wi-Fi) network connections), or a wide area network (e.g., Internet). The host computer 101 and the endpoint device 102 may each also be referred to as an information handling system. The endpoint device 102 may be located at a location that is remote from the host computer 101. In one embodiment, endpoint device 102 may be coupled in digital communication with host computer 101 (e.g., by the Internet, corporate intranet or other long distance digital network) and may be located at a location that is geographically remote to the host computer 101 such as in a different building in the same city, different city, different state, different country, etc. In another embodiment, endpoint device 102 may be coupled in digital communication with host computer 101 (e.g., by a wireless local area network (WLAN), local area network (LAN), etc.) and may be located at a location that is remote to the host computer 101 within the same building, dwelling, etc.

The endpoint device 102 includes one or more speakers 110, a microphone 113, a camera 112, a recognition controller 111, and a communication protocol endpoint 109. The endpoint device 102 also includes a programmable integrated circuit (not shown) that executes the recognition controller 111 and the communication protocol endpoint 109 and a memory (not shown) for storing them. The camera 112 provides image data to the recognition controller 111, which provides image data to the communication protocol endpoint 109 and/or commands to the communication protocol endpoint 109 in response to the image data (e.g., in response to recognizing a gesture or face). The microphone 113 provides an audio stream to the communication protocol endpoint 109. The speaker 110 receives an audio stream from the communication protocol endpoint 109. In one embodiment, the endpoint device 102 comprises a Raspberry Pi coupled to one or more speakers and microphone (e.g., 2-microphone array). The Raspberry Pi may be executing a Linux operating system. Preferably, such an endpoint device is activated and deactivated by an endpoint device control program, e.g., the user's cell phone. Advantageously, such an endpoint device may be low cost and have a small space requirement. In another embodiment, the endpoint device 102 comprises a personal computer (e.g., desktop or notebook computer) having a microphone, speaker and camera (e.g., webcam). The personal computer may be executing a Linux operating system. Preferably, the camera facilitates operation of an FGRC. Preferably, such an endpoint device is activated and deactivated by an endpoint device control program, e.g., the user's cell phone. In yet another embodiment, the endpoint device 102 comprises a cell phone.

The host computer 101 includes a communication protocol endpoint 103, a voice recognition and synthesis controller (VRSC) 104, telecommunications software 105, an email controller 106 (in communication with an email program (not shown) running on the host computer 101), a voice assistant 107, and an audio I/O controller 108. The host computer 101 includes a programmable integrated circuit that executes the communication protocol endpoint 103, VRSC 104, telecommunications software 105, email controller 106, voice assistant 107 and audio I/O controller 108, and a memory (not shown) that stores them. The communication protocol endpoint 103 and the communication protocol endpoint 109 establish one or more real-time audio/data/media channels between the host computer 101 and endpoint device 102 so that audio/data/media streams may be transmitted and received between the host computer 101 and endpoint device 102.

Figure 2:
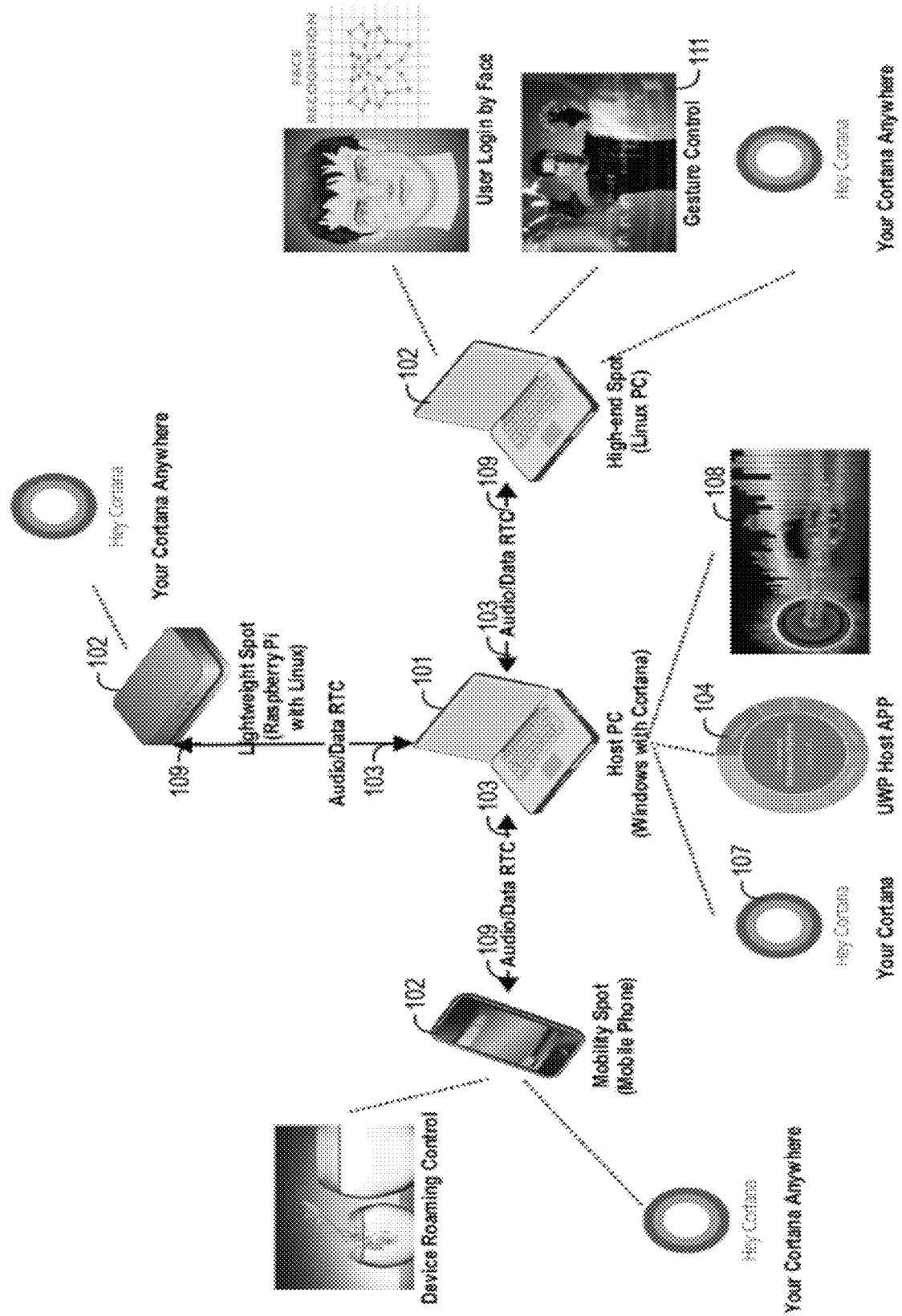
FIG. 2 is a diagram of an example embodiment of the system of FIG. 1.

FIG. 2 is a diagram illustrating an example embodiment of the system 100 of FIG. 1. Many elements of FIG. 2 are shown in FIG. 1 and like numbered elements are similar. The system 100 includes a host computer 101, e.g., PC running Window 10 with integrated Cortana 107, that executes a voice recognition/synthesis controller 104 (e.g., a UWP host application) and audio I/O controller 108. The host computer 101 executes a communication protocol endpoint 103 for communication with three endpoint devices 102, each of which is executing an communication protocol endpoint 109. Additionally, although not shown, the host computer 101 executes an email controller 106 and telecommunications software 105. The first endpoint device 102 is a laptop PC that includes a camera, microphone and speaker (not shown). The first endpoint device 102 is running a Linux operating system and a recognition controller 111 for performing gesture recognition and facial recognition for login purposes. The second endpoint device 102 is a Raspberry Pi that includes a microphone and speaker (not shown) and that is running a Linux operating system. The third endpoint device 102 is a mobile phone that includes a camera, microphone and speaker (not shown) (e.g., running the Android operating system or iOS). The mobile phone executes an application for controlling roaming of the endpoint devices 102, i.e., for enabling a user to control the activation and deactivation of the endpoint devices 102 to accomplish voice assistant and telecommunications software extension and enhancement of the host computer 101.

Figure 3:
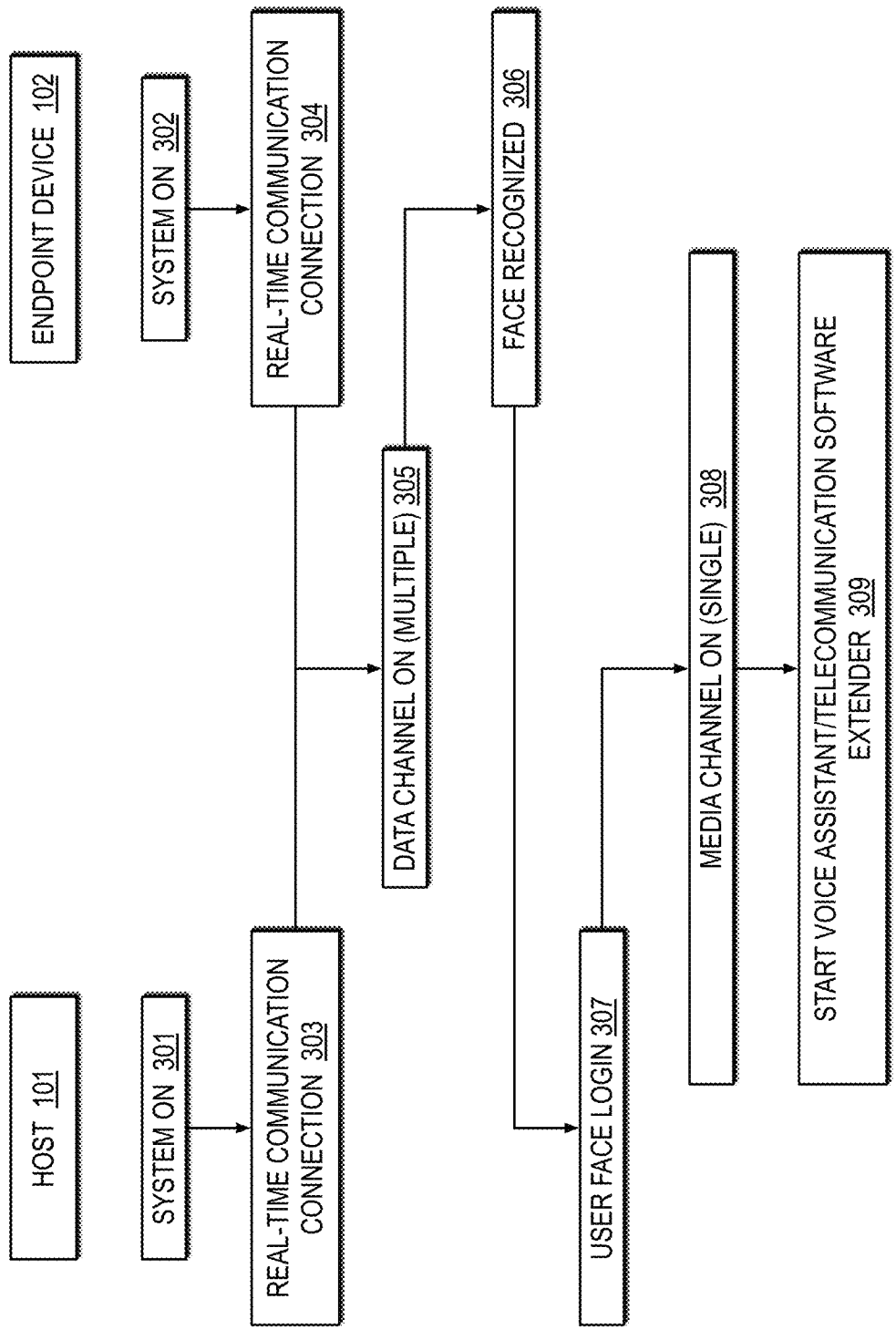
FIG. 3 is a flowchart illustrating operation of the system of FIG. 1 to establish one or more communication channels between the host computer and one or more endpoint devices.

FIG. 3 is a flowchart illustrating operation of the system 100 of FIG. 1 to establish one or more communication channels between the host computer 101 and one or more endpoint devices 102 according to one embodiment of the disclosed systems and methods. Initially, at block 301, the host computer 101 is turned on, and at block 302 the endpoint device 102 is turned on. Next, the host computer 101 and endpoint device 102 establish a communications connection at blocks 303 and 304 via the communication protocol endpoints 103/109, e.g., via WebRTC. Then, one or more data channels are established at block 305 between the host computer 101 and the endpoint device 102 via the communication protocol endpoints 103/109. Subsequently, in one embodiment to provide enhanced security, the endpoint device 102 recognizes the face of the user at block 306 and sends corresponding information over the data channel to the host computer 101, which the host computer 101 uses to perform a user face login on the host computer 101 at block 307. In response, the host computer 101 establishes a media channel at block 308 between the host computer 101 and the endpoint device 102. Finally, extension of the host computer's 101 voice assistant 107, telecommunications software 105, and/or email program is started at block 309, and the endpoint device 102 is activated.

Figure 4:
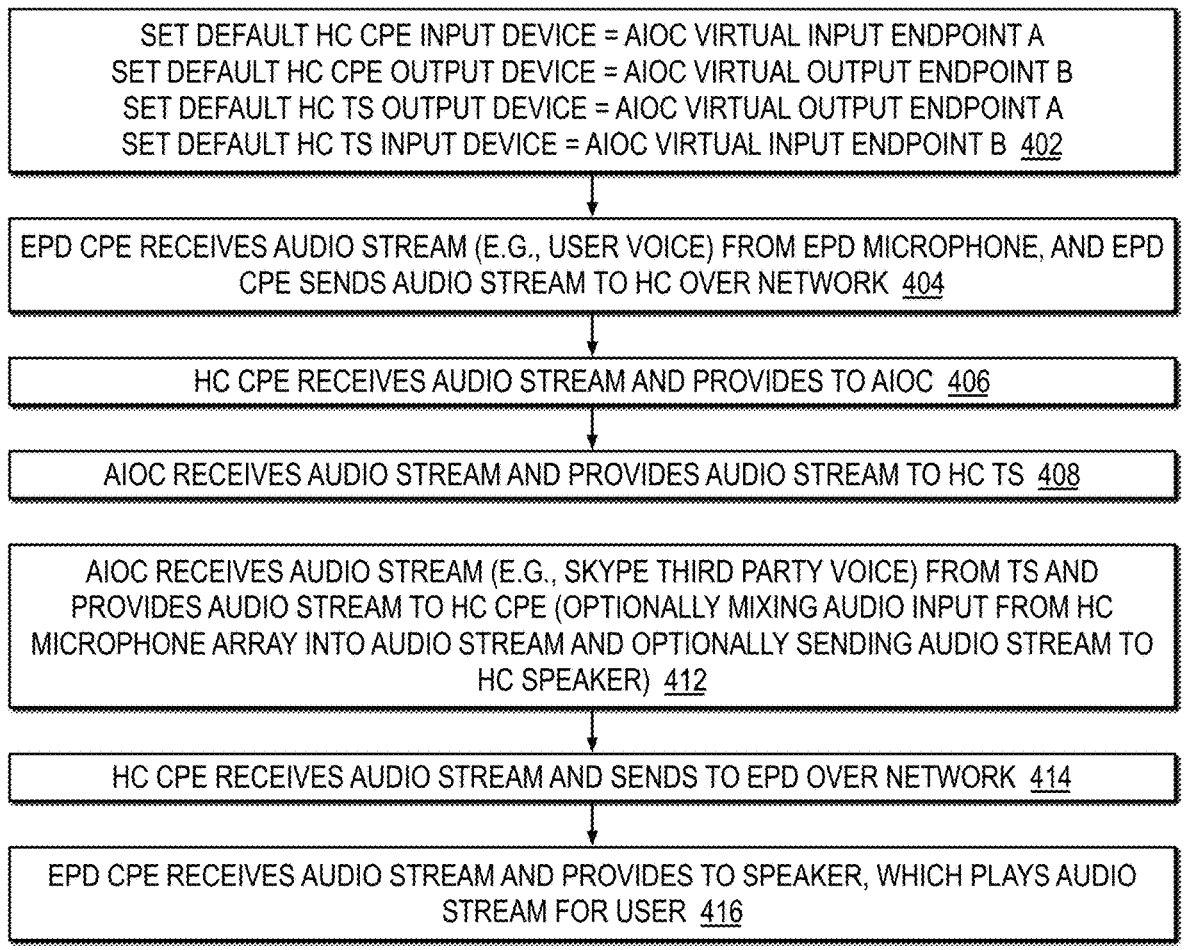
FIG. 4 is a flowchart illustrating operation of the system of FIG. 1 to extend telecommunications software capabilities of the host computer to one or more endpoint devices.

FIG. 4 is a flowchart illustrating operation 400 of the system 100 of FIG. 1 to extend telecommunications software capabilities of the host computer 101 to one or more endpoint devices 102 according to one embodiment of the disclosed systems and methods. More specifically, FIG. 4 illustrates the ability for the user of the endpoint device 102 to use the telecommunications software 105 when away from the host computer 101. The operation begins at block 402.

At block 402, the default input device for the communication protocol endpoint 103 of the host computer 101 is set to a virtual input device of the audio I/O controller 108, referred to as virtual output endpoint A; the default output device for the communication protocol endpoint 103 of the host computer 101 is set to a virtual input device of the audio I/O controller 108, referred to as virtual output endpoint B; the default output device for the telecommunications software 105 of the host computer 101 is set to a virtual output device of the audio I/O controller 108, referred to as virtual output endpoint A; and the default input device for the telecommunications software 105 of the host computer 101 is set to a virtual input device of the audio I/O controller 108, referred to as virtual input endpoint B. A virtual input device is a software construct that receives input data from another software program similar to the manner in which a hardware input device receives input data. A virtual output device is a software construct that provides output data to another software program similar to the manner in which a hardware output device provides output data. The operation proceeds to block 404.

At block 404, the communication protocol endpoint 109 of the endpoint device 102 receives an audio stream (e.g., the user's voice) from the microphone 113, and the communication protocol endpoint 109 sends the audio stream over the network 114 to the host computer 101. The operation proceeds to block 406.

At block 406, the communication protocol endpoint 103 of the host computer 101 receives the audio stream and provides it to the audio I/O controller 108. The operation proceeds to block 408.

At block 408, the audio I/O controller 108 provides the audio stream to the telecommunications software 105 of the host computer 101. In one embodiment, the virtual output endpoint B sends the audio stream to virtual input endpoint B and, in the process, performs digital replication and effects a Group B transfer. The audio I/O controller 108 creates a connection between the two endpoints by replicating a digital signal from the output endpoint to the input endpoint. The Group B settings are set for providing the input audio source for the host computer 101. Preferably, the telecommunications software 105 sends the audio stream to the third parties with whom the user is speaking via the endpoint device 102, e.g., over the Internet and/or cellular phone network.

At block 412, the audio I/O controller 108 receives an audio stream from the telecommunications software 105 (e.g., which audio stream the telecommunications software 105 received over the Internet and/or cellular phone network of the third parties with whom the user is speaking) and provides the audio stream to the communication protocol endpoint 103. The audio stream may be, for example, voice input received from a person to whom the user of the endpoint device 102 is speaking during a Skype conversation. In one embodiment, the virtual output endpoint A sends the audio stream to virtual input endpoint A and, in the process, performs digital replication and effects a Group A transfer. The audio I/O controller 108 creates a connection between the two endpoints by replicating a digital signal from the output endpoint to the input endpoint. The Group A settings are set for providing the output audio source for the host computer 101. The operation proceeds to block 414.

At block 414, the communication protocol endpoint 103 receives the audio stream and sends it to the endpoint device 102 over the network 114. The operation proceeds to block 416.

At block 416, the communication protocol endpoint 109 of the endpoint device 102 receives the audio stream sent by the host computer 101 and provides the audio stream to the speaker 110, which plays the audio stream for the user of the endpoint device 102.

Although FIG. 4 depicts what appears to be a single transmission and reception exchange, it should be understood that continuous transmissions and receptions may occur, for example during the course of a Skype call. Furthermore, although the transmission and reception appear to be sequentially performed in FIG. 4, it should be understood that the transmission and reception may occur concurrently. In addition, the audio I/O controller 108 may mix audio input received from a microphone array of the host computer 101 into the audio stream, and the audio I/O controller 108 may provide the audio stream to a speaker of the host computer 101 (e.g., at block 412). In one embodiment, the audio I/O controller 108 additionally employs a hardware stereo mixer, and the default input device for the communication protocol endpoint 103 is set to the hardware stereo mixer. The hardware stereo mixer may be a coder-decoder (CODEC) that makes audio data streams from an output port to an input port without additional software application support. In one embodiment, the audio I/O controller 108 is implemented as software without the assistance of a hardware mixer. Preferably, the audio I/O controller 108 sets the default input and output devices. These different aspects of the extension of the host computer 101 functionality may also be true of some aspects of similar operations performed with respect to FIGS. 5 through 7.

Figure 5:
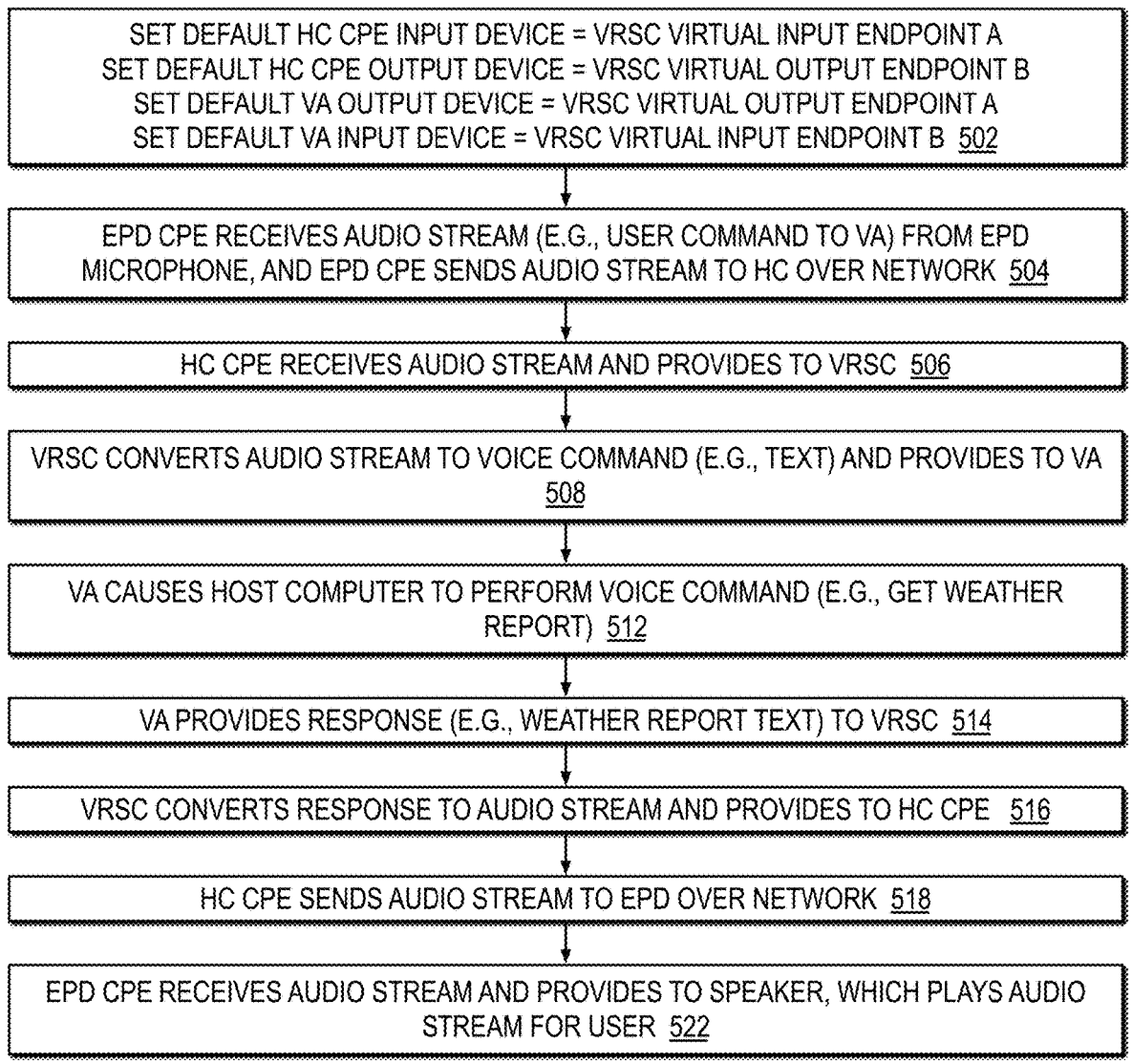
FIG. 5 is a flowchart illustrating operation of the system of FIG. 1 to extend voice assistant capabilities of the host computer to one or more endpoint devices.

FIG. 5 is a flowchart illustrating operation 500 of the system 100 of FIG. 1 to extend voice assistant capabilities of the host computer 101 to one or more endpoint devices 102 according to one embodiment of the disclosed systems and methods. More specifically, FIG. 5 illustrates the ability for the user of the endpoint device 102 to use the voice assistant 107 when away from the host computer 101. The operation begins at block 502.

At block 502, the default input device for the communication protocol endpoint 103 of the host computer 101 is set to a virtual output device of the voice recognition/synthesis controller 104, referred to as virtual input endpoint A; the default output device for the communication protocol endpoint 103 of the host computer 101 is set to a virtual output device of the voice recognition/synthesis controller 104, referred to as virtual output endpoint B; the default output device for the voice assistant 107 of the host computer 101 is set to a virtual output device of the audio I/O controller 108, referred to as virtual output endpoint A; and the default input device for the voice assistant 107 of the host computer 101 is set to a virtual input device of the audio I/O controller 108, referred to as virtual input endpoint B. Preferably, the audio I/O controller 108 sets the default input and output devices. The operation proceeds to block 504.

At block 504, the communication protocol endpoint 109 of the endpoint device 102 receives an audio stream (e.g., a user command, e.g., "Hey Cortana, what's the weather going to be like today?" or "Hey Cortana, play song X by artist Y.") from the microphone 113, and the communication protocol endpoint 109 sends the audio stream over the network 114 to the host computer 101. The operation proceeds to block 506.

At block 506, the communication protocol endpoint 103 of the host computer 101 receives the audio stream and provides it to the voice recognition/synthesis controller 104. The operation proceeds to block 508.

At block 508, the voice recognition/synthesis controller 104 converts the audio stream to a voice command (e.g., text) for provision to the voice assistant 107. The operation proceeds to block 512.

At block 512, the voice assistant 107 causes the host computer 101 to perform the voice command (e.g., get today's weather report, listen to song X by artist Y). The operation proceeds to block 514.

At block 514, the voice assistant 107 provides the text response requested by the voice command (e.g., text of the weather report) to the voice recognition/synthesis controller 104. The operation proceeds to block 516.

At block 516, the voice recognition/synthesis controller 104 converts the response text to an audio stream and provides the audio stream to the communication protocol endpoint 103. Alternatively, the voice assistant 107 may cause a different audio stream (e.g., of music, e.g., from an iTunes application) to be provided to the communication protocol endpoint 103. The operation proceeds to block 518.

At block 518, the communication protocol endpoint 103 sends the audio stream over the network 114 to the endpoint device 102. The operation proceeds to block 522.

At block 522, the communication protocol endpoint 109 of the endpoint device 102 receives the audio stream sent by the host computer 101 and provides the audio stream to the speaker 110, which plays the audio stream for the user of the endpoint device 102.

Figure 6:
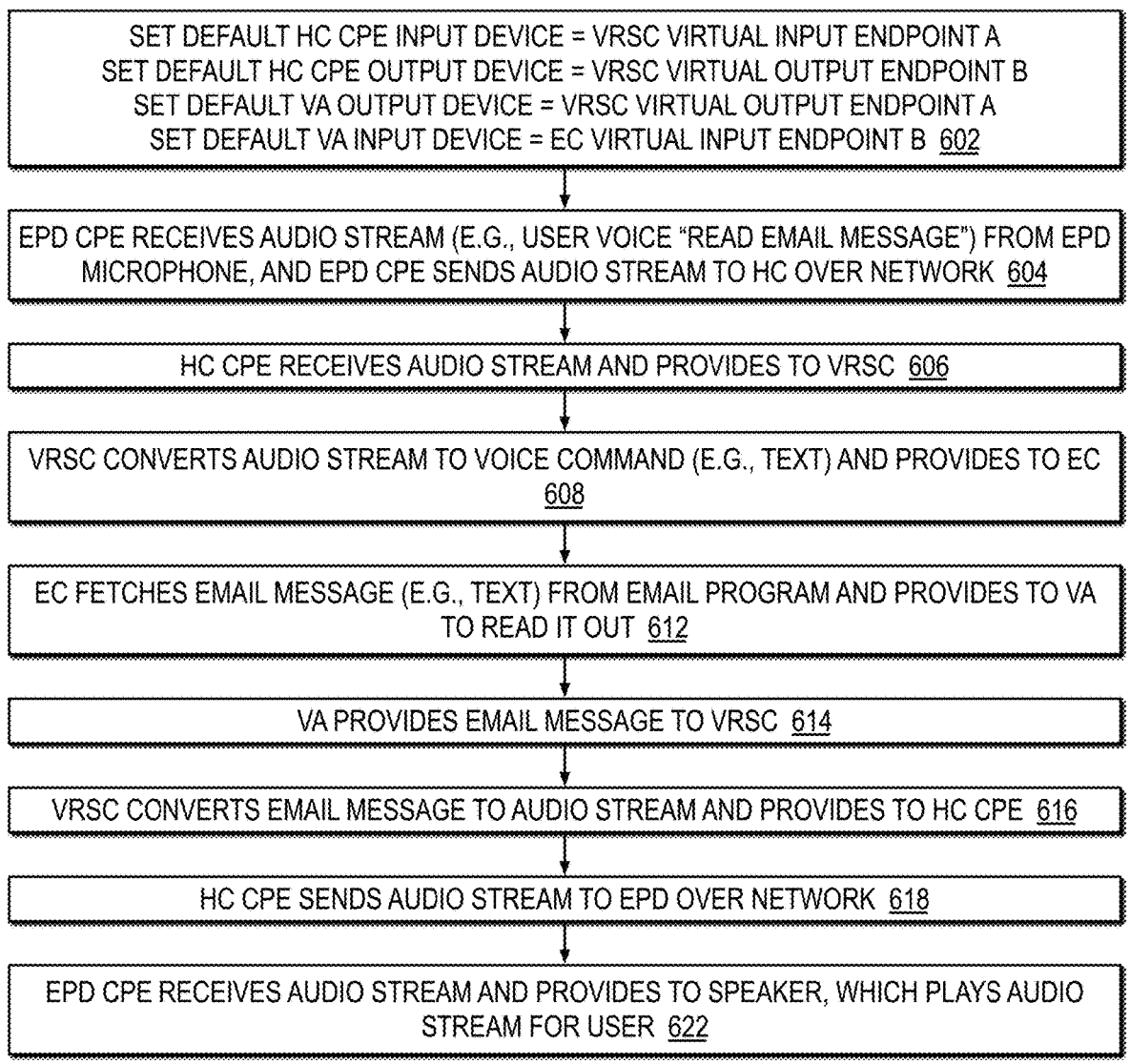
FIG. 6 is a flowchart illustrating operation of the system of FIG. 1 to provide the ability for the user of an endpoint device to read an email message when away from the host computer.

FIG. 6 is a flowchart illustrating operation 600 of the system 100 of FIG. 1 to extend voice assistant capabilities of the host computer 101 to one or more endpoint devices 102 according to one embodiment of the disclosed systems and methods. More specifically, FIG. 6 illustrates the ability for the user of the endpoint device 102 to read an email message when away from the host computer 101. The operation begins at block 602.

At block 602, the default input device for the communication protocol endpoint 103 of the host computer 101 is set to a virtual input device of the voice recognition/synthesis controller 104, referred to as virtual input endpoint A; the default output device for the communication protocol endpoint 103 of the host computer 101 is set to a virtual output device of the voice recognition/synthesis controller 104, referred to as virtual output endpoint B; the default output device for the voice assistant 107 of the host computer 101 is set to an output of the audio I/O controller 108, referred to as virtual output endpoint A; and the default input device for the voice assistant 107 of the host computer 101 is set to a virtual input endpoint B of the email controller 106. Preferably, the audio I/O controller 108 sets the default input and output devices. The operation proceeds to block 604.

At block 604, the communication protocol endpoint 109 of the endpoint device 102 receives an audio stream (e.g., a user command, e.g., "Hey Cortana, please read my most recent email message.") from the microphone 113, and the communication protocol endpoint 109 sends the audio stream over the network 114 to the host computer 101. The operation proceeds to block 606.

At block 606, the communication protocol endpoint 103 of the host computer 101 receives the audio stream and provides it to the voice recognition/synthesis controller 104. The operation proceeds to block 608.

At block 608, the voice recognition/synthesis controller 104 converts the audio stream to a voice command (e.g., text) for provision to the email controller 106. The operation proceeds to block 612.

At block 612, the email controller 106 fetches the email message (e.g., text) from the email program (e.g., Outlook) and provides it to the voice assistant 107 so that the voice assistant 107 can read out the email message. The operation proceeds to block 614.

At block 614, the voice assistant 107 provides the email message text to the voice recognition/synthesis controller 104. The operation proceeds to block 616.

At block 616, the voice recognition/synthesis controller 104 converts the email message text to an audio stream and provides the audio stream to the communication protocol endpoint 103. The operation proceeds to block 618.

At block 618, the communication protocol endpoint 103 sends the audio stream over the network 114 to the endpoint device 102. The operation proceeds to block 622.

At block 622, the communication protocol endpoint 109 of the endpoint device 102 receives the audio stream sent by the host computer 101 and provides the audio stream to the speaker 110, which plays the audio stream for the user of the endpoint device 102.

Figure 7:
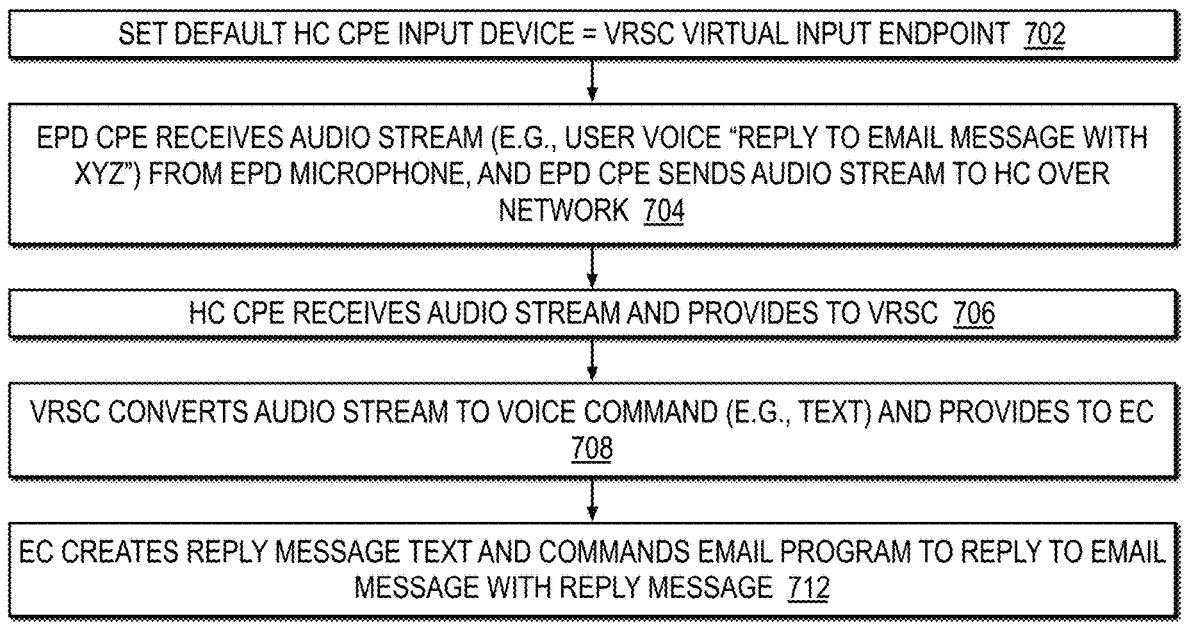
FIG. 7 is a flowchart illustrating operation of the system of FIG. 1 to provide the ability for the user of an endpoint device to reply to an email message when away from the host computer.

FIG. 7 is a flowchart illustrating operation 700 of the system 100 of FIG. 1 to extend voice assistant capabilities of the host computer 101 to one or more endpoint devices 102 according to one embodiment of the disclosed systems and methods. More specifically, FIG. 7 illustrates the ability for the user of the endpoint device 102 to reply to an email message when away from the host computer 101. The operation begins at block 702.

At block 702, the default input device for the communication protocol endpoint 103 of the host computer 101 is set to a virtual input device of the voice recognition/synthesis controller 104, referred to as a virtual input endpoint. The operation proceeds to block 704.

At block 704, the communication protocol endpoint 109 of the endpoint device 102 receives an audio stream (e.g., a user command, e.g., "Hey Cortana, please reply my most recent email message with, 'Yes, I will do it by Friday.'")

from the microphone 113, and the communication protocol endpoint 109 sends the audio stream over the network 114 to the host computer 101. The operation proceeds to block 706.

At block 706, the communication protocol endpoint 103 of the host computer 101 receives the audio stream and provides it to the voice recognition/synthesis controller 104. The operation proceeds to block 708.

At block 708, the voice recognition/synthesis controller 104 converts the audio stream to a voice command (e.g., text) for provision to the email controller 106. The operation proceeds to block 712.

At block 712, the email controller 106 creates the reply message (e.g., text) and gives the email program (e.g., Outlook) a command to reply to the email message with the reply message.

It will be understood that the steps of FIGS. 3 through 7 are exemplary only, and that any combination of fewer, additional and/or alternative steps may be employed that are suitable for extending voice assistant and telecommunications software capabilities of a host computer to one or more endpoint devices.

It will be understood that one or more of the tasks, functions, or methodologies described herein (e.g., including those described herein for components 101 and 102 of FIG. 1, etc.) may be implemented by circuitry and/or by a computer program of instructions (e.g., computer readable code such as firmware code or software code) embodied in a non-transitory tangible computer readable medium (e.g., optical disk, magnetic disk, non-volatile memory device, etc.), in which the computer program comprising instructions is configured when executed on a processing device in the form of a programmable integrated circuit (e.g., processor such as CPU, controller, microcontroller, microprocessor, ASIC, etc. or programmable logic device "PLD" such as FPGA, complex programmable logic device "CPLD", etc.) to perform one or more steps of the methodologies disclosed herein. In one embodiment, a group of such processing devices may be selected from the group consisting of CPU, controller, microcontroller, microprocessor, FPGA, CPLD and ASIC. The computer program of instructions may include an ordered listing of executable instructions for implementing logical functions in an information handling system or component thereof. The executable instructions may include a plurality of code segments operable to instruct components of an information handling system to perform the methodologies disclosed herein.

It will also be understood that one or more steps of the present methodologies may be employed in one or more code segments of the computer program. For example, a code segment executed by the information handling system may include one or more steps of the disclosed methodologies. It will be understood that a processing device may be configured to execute or otherwise be programmed with software, firmware, logic, and/or other program instructions stored in one or more non-transitory tangible computer-readable mediums (e.g., data storage devices, flash memories, random update memories, read only memories, programmable memory devices, reprogrammable storage devices, hard drives, floppy disks, DVDs, CD-ROMs, and/or any other tangible data storage mediums) to perform the operations, tasks, functions, or actions described herein for the disclosed embodiments.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touch screen and/or a video display. The information handling system may also include one or more buses operable to transmit communications between the various hardware components.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed methods and systems may be utilized in various combinations and/or independently. Thus, the invention is not limited to only those combinations shown herein, but rather may include other combinations.

What is claimed is:

1. A method, comprising extending functionality of a voice assistant and/or email program running on a host computer positioned at a first location to a remote second location via an endpoint device positioned at the second location and that includes a microphone by:

sending, by a communications protocol running on the endpoint device, an audio stream from the endpoint device positioned at the second location to the host computer over a digital communications network to command the voice assistant and/or email program running at the first location on the host computer to control operation of the host computer positioned at the first location, wherein the audio stream is a digital data version of a voice command spoken by a user into the endpoint device microphone;

receiving the audio stream from a communications protocol running on the host computer positioned at the first location;

using voice recognition to convert the audio stream to a text command;

providing the text command to the voice assistant and/or email program;

using the voice assistant and/or email program running on the host computer positioned at the first location to receive and respond to the text command converted from the audio stream from the endpoint device that is positioned at the second location by reading and/or replying to an email message stored by the email program at the first location; and mixing audio input received from a microphone array of the host computer at the first location into at least one audio stream.

2. The method of claim 1, further comprising:
receiving from the voice assistant and/or an email controller a text response to the text command;
using voice recognition to convert the text response to a second audio stream; and
sending, by the communications protocol running on the host computer, the second audio stream to the endpoint device over the network; and
providing, by the communications protocol running on the endpoint device, the second audio stream to a speaker of the endpoint device for playing for the user.

3. The method of claim 2, wherein the text response comprises the email message provided by the email program to the email controller.

4. The method of claim 1, wherein the text command comprises text in reply to the email message.

5. The method of claim 1, further comprising responding to the text command by causing a second audio stream of music to be provided to the communications protocol running on the host computer for provision to the endpoint device over the network.

6. The method of claim 1, wherein the endpoint device comprises a camera; and where the method further comprises:
recognizing, by the endpoint device, a face of the user or a gesture by the user and viewed by the camera;
sending, by the communications protocol running on the endpoint device, a second audio stream to the host computer over the network, wherein the second audio stream is a digital data version of a command generated in response to said recognizing; and
performing, by the host computer, an action in response to receiving the second audio stream, wherein the action is one of the following list of actions:
login to the host computer based on the recognized face of the user; and
an action based on the recognized gesture made by the user from one of the following list of actions:
activate/deactivate an endpoint device;
control a volume;
control mute/unmute a call; and
hang up a call.

7. The method of claim 2, where the mixing the audio input received from the microphone array of the host computer at the first location into at least one audio stream comprises mixing the audio input received from the microphone array of the host computer into the second audio stream; and where the method further comprises providing the second audio stream to a speaker of the host computer at the first location.

* * * * *